Mar. 20, 1923.

1,448,723

J. W. BRUNDAGE

FRINGE CUTTING MACHINE

Filed Apr. 17, 1922 2 sheets-sheet 1

Inventor:
James W. Brundage,
by Spra Middleton Donaldson & Hall
Attys.

Mar. 20, 1923.

J. W. BRUNDAGE

FRINGE CUTTING MACHINE

Filed Apr. 17, 1922

Inventor:
James W. Brundage,
by John Middleton Donaldson & Hall
Attys.

Patented Mar. 20, 1923.

1,448,723

UNITED STATES PATENT OFFICE.

JAMES W. BRUNDAGE, OF AKRON, OHIO, ASSIGNOR TO THE MILLER RUBBER COMPANY, OF AKRON, OHIO, A CORPORATION OF OHIO.

FRINGE-CUTTING MACHINE.

Application filed April 17, 1922. Serial No. 553,795.

*To all whom it may concern:*

Be it known that I, JAMES W. BRUNDAGE, a citizen of the United States, and a resident of Akron, in the county of Summit and State of Ohio, have invented certain new and useful Improvements in Fringe-Cutting Machines, of which the following is a specification.

My present invention relates to the production of sheet rubber fringe material such as is used in trimming bath caps, capes and similar sheet rubber articles, such fringe material comprising an elongated sheet or strip which is provided with a plurality of parallel slits extending from one edge towards, but not completely to, the other edge.

The invention aims to provide a machine which will perform the cutting of such strips in an accurate, economical and expeditious manner, and which will be of simple form, and durable in use.

With these and other objects in view, the invention includes the novel features of construction and arrangement and combination of parts hereinafter described, the nature of my invention being particularly defined by the appended claims.

An embodiment of the invention is illustrated in the accompanying drawings in which—

Figure 1:
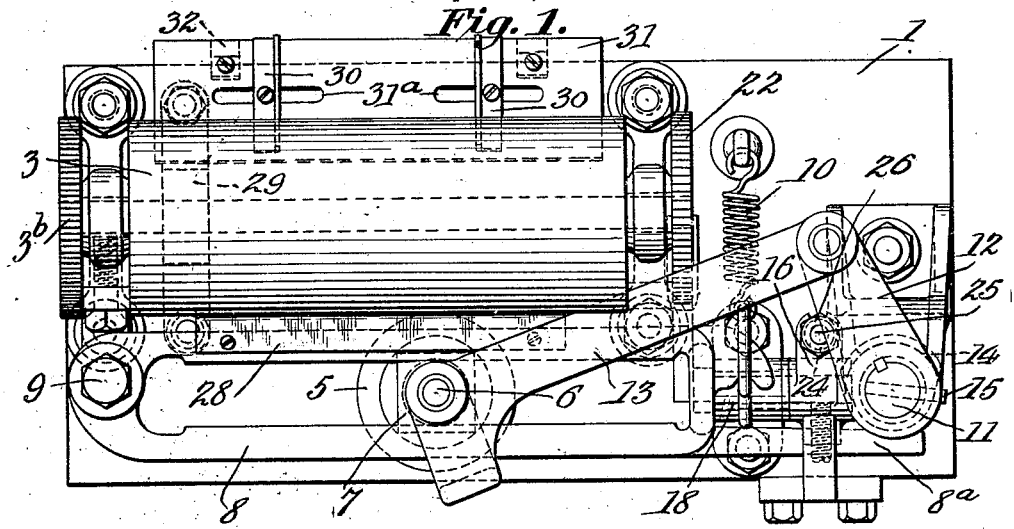
Figure 1 is a front elevation showing my improved cutting machine.
Figure 2:
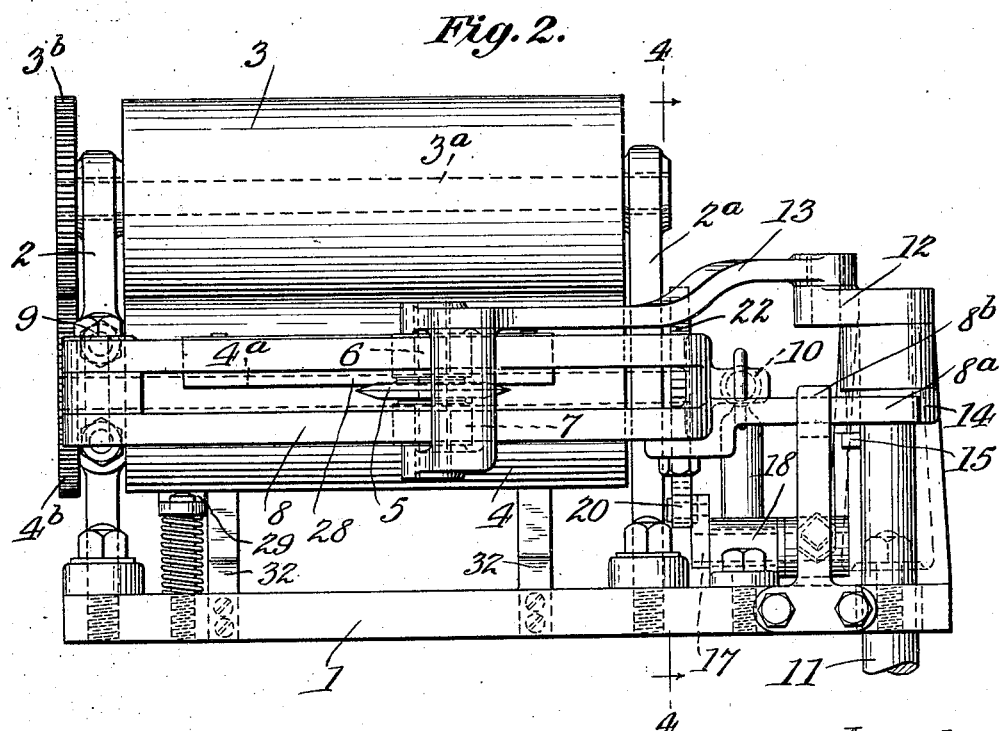
Fig. 2 is a front elevation.
Figure 3:
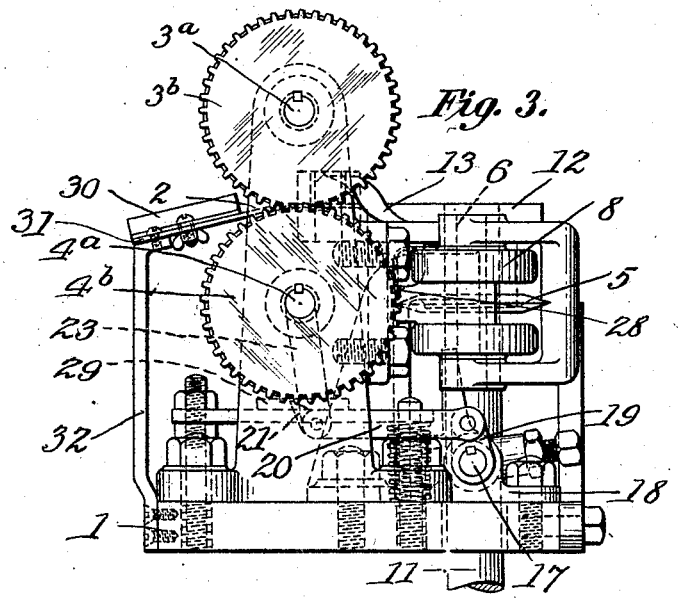
Fig. 3 is an end view.

Referring more particularly to these drawings, in which like reference characters indicate the same or similar parts whenever used, the numeral 1 designates a suitable base or support upon which are mounted the vertical standards 2, 2ª which are provided with bearings in which are journaled the shafts 3ª and 4ª of the rolls 3 and 4.

The rubber sheet to be slitted is fed between the two rolls, which are geared to rotate in unison by gears 3ᵇ and 4ᵇ driven in the manner hereinafter described, and one of the rolls (4) serves as a platen or support against which the reciprocating cutting knife 5 acts, said knife moving longitudinally of the roll in one direction to slit the sheet and being removed from the roll while moving in the reverse direction, which interval is used to feed the sheet the distance requisite for the next slit.

The roll 4 which constitutes the platen is preferably a hardened steel roll while the cooperating roll 3 is preferably covered with rubber or other suitable yielding material. The knife is preferably in the shape of a circular or disc cutter having a V-shaped edge, though I do not desire to limit myself to this form of cutter.

The cutter is journaled on a shaft 6 carried by slide blocks 7, the blocks and shaft in effect constituting a cross head, and said blocks being slidably guided by the guide frame 8. This guide frame has one end pivoted at 9 to a lug projecting from the standard while its other end is acted upon by a spring 10, tending to swing the guide in such a direction as to cause the cutter to be pressed against the platen.

Power is imparted to the machine through a vertical shaft 11 extending down through the table, the lower end of which may be driven in any convenient manner and from any suitable source of power, the same not being shown, as it constitutes no part of the present invention.

The shaft carries at its upper end a crank 12 which is connected by a link 13 to the ends of shaft member 6 and thus imparts to the cutter the reciprocating motion hereinbefore referred to.

The shaft 11 also carries two cams designated 14 and 15 respectively.

Figure 4:
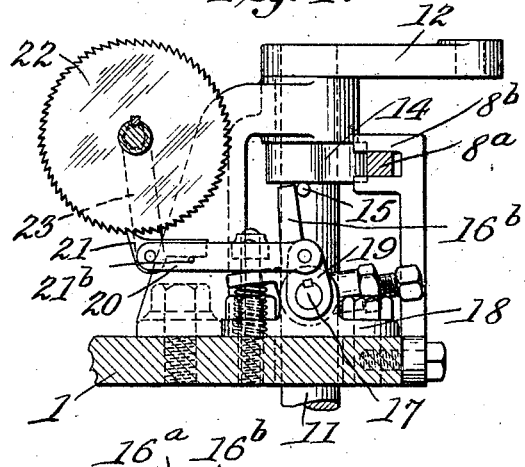
Fig. 4 is a section on line 4—4 of Fig. 2, looking in the direction of the arrow.
Figure 5:
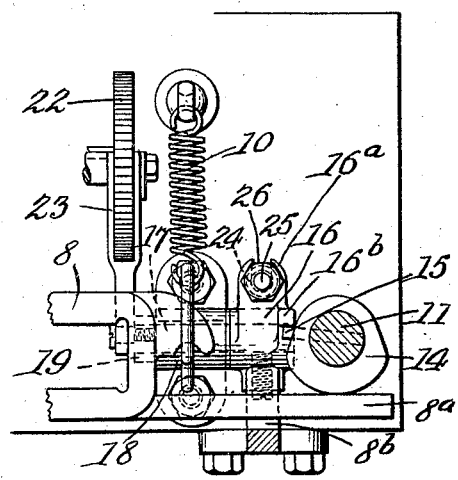
Figs. 5 and 6 are detail views.
Figure 6:
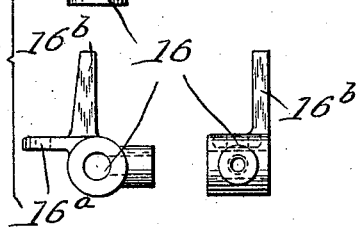

Cam 14 cooperates with an arm or extension 8ª of the guide frame 8, (Figs. 4 and 5), the high part of the cam moving the frame against the tension of the spring to remove the cutter from the platen during its movement in one direction and the low part of the cam permitting the spring to return the cutter into cutting position for and during its movement in the reverse direction.

Arm 8ª is preferably guided in its movement by a forked guide 8ᵇ.

It is necessary that the rolls shall be held stationary during the cutting action and given the requisite movement during the idle stroke of the cutter to feed the material preparatory to the next cut.

This is accomplished through cam 15 in the following manner:

This cam 15, in the embodiment shown, comprises a projecting pin or member which contacts with arm 16$^b$ of a rocker member 16 once during each rotation of shaft 11. This rocker arm is fast on a small shaft 17 journaled in a bearing bracket 18 supported by base member 1, which shaft in turn carries an arm 19 to which is pivotally connected a link 20.

Link 20 extends into proximity to a ratchet wheel 22 fast on roll shaft 3$^a$ and carries a pawl 21 cooperating with such ratchet wheel, so that under the action of the cam 15 the ratchet wheel, and hence the roll, will be turned the requisite distance. To insure the pawl being held in proper relation to the ratchet wheel I preferably provide a link 23 which has one end pivotally connected to the pawl carrying end of link 20 and the other end connected to the roll shaft whereby the pawl is caused to move circumferentially of the ratchet wheel.

The pawl preferably has a weighted portion tending to hold it in ratchet engaging position, and a stop 21$^b$ limits its movement.

After the cam or pin 15 has operated and passed arm 16$^b$, the latter is returned to initial position by a spring 24 surrounding a stud 25 screwed into the base and acting against the forked end of an abutment arm 16$^a$ carried by rocker 16, the fork embracing stud 25 and overlying the spring.

A nut or stop 26 on the stud 25 limits the movement of the arm 16 in a clockwise direction, and said nut or stop 26, being adjustable, affords adjustment means whereby the amount of roll rotation at any one movement may be varied, and hence the cuts made nearer together or further apart as desired.

A yieldable presser device is preferably provided on or in connection with the guide 8 which in the form shown is in the shape of a spring metal bar 28 carried by said guide and so located that when the guide is pulled towards the platen by the spring said bar presses against the sheet on the roll adjacent the cutting edge of the knife. This prevents the rubber from being pushed or rolled up ahead of the cutting device. The presser bar is, of course, moved out of contact with the sheet when the guide is moving back for the return of the cutter.

To prevent any danger of the platen overrunning under the impelling action of the pawl, I provide a friction brake acting against the platen, as indicated at 29.

It is, of course, obvious that the cutter must not travel clear across the sheet, otherwise it would be completely severed, and that an unsevered margin must be left to produce the fringe. This is insured by providing adjustable guides for the sheet so that it may be fed in with one edge a suitable distance beyond the limit of the stroke of the cutter. Such guides are shown at 30, 30 and may take the form of angle plates secured to the feed table 31 by bolts passing through elongated slots 31$^a$, the feed table being supported by standards 32 secured to the base of the machine.

While I have described my invention in connection with the cutting or slitting of rubber sheets for which it is particularly adapted, it will be understood that I do not limit myself to this specific use, as it could be used for cutting sheets of other materials or composition.

Having thus described my invention, what I claim is:

1. In a machine of the class described, a platen and cooperating presser roll, means for intermittently moving the same to feed a sheet in contact with the platen, a cutter mounted to reciprocate in proximity to said platen transversely of the line of feed, means for pressing said cutter against the platen during its movement in one direction, means for holding it away from the platen on movement in the reverse direction, and means for intermittently moving said platen.

2. In a machine of the class described, an intermittently moving platen, an elongated guide member arranged adjacent to the surface of said platen and movable towards and from the same with means for moving it, and a reciprocating cutter supported by said guide with means for operating said cutter.

3. In a machine of the class described, a suitable frame, a platen movably supported thereby with means for imparting intermittent movement thereto, an elongated guide adjacent the surface of said platen and having one end pivotally connected with said support, means for swinging the other end towards and from the platen and a reciprocating cutter supported by said guide with means for operating it.

4. In a machine of the class described, a rotatable cylindrical platen, a guide arm arranged adjacent the surface thereof and mounted to move towards and from the platen in a plane substantially perpendicular thereto, a cutting device slidably supported by said guide arm, an operating crank, a link connecting such crank with said cutter and means for intermittently moving said platen.

5. In a machine of the class described, sheet feeding means including a platen, a cutting device mounted to move across said rotating cylindrical platen substantially transversely of the line of feed with means for operating it, and means for causing said cutting device to contact with the material on said platen during its movement in one direction and to clear the same on movement in the opposite direction, means whereby the feed is operated during the idle stroke of the cutter, and presser means acting against the sheet adjacent the cutter during its cutting stroke.

6. In a machine of the class described, a platen and cooperating presser roll, means for intermittently moving the same to feed a sheet in contact with the platen, a rotary disc cutter mounted to reciprocate in proximity to said platen transversely of the line of feed, means for pressing said cutter against the platen during its movement in one direction, means for holding it away from the platen on movement in the reverse direction.

7. In a machine of the class described, a rotatable cylindrical platen, a guide arm arranged adjacent the surface thereof and mounted to move towards and from the platen in a plane substantially perpendicular thereto, cam means for moving said guide arm, a cutting device slidably supported by said guide arm, an operating crank, a link connecting such crank with said cutter and means for intermittently moving said platen.

8. In a machine of the class described, a rotatable cylindrical platen, a presser roll cooperating therewith, a guide arm comprising parallel spaced members having guides, slide bearing blocks mounted in said guides, a cutting disc rotatably supported by said bearing blocks, said guide arm having one end articulated to a fixed pivot, means for swinging the other end towards and from the platen, means for reciprocating said bearing blocks, and means for rotating the platen intermittently.

9. In a machine of the class described, a rotatable cylindrical platen, a presser roll cooperating therewith, a guide arm having one end articulated on a fixed pivot adjacent one end of the platen, a spring acting on the free end of the arm to draw it towards the platen, a cutter slidably carried by said arm, a drive shaft, means whereby the rotation of the drive shaft operates the cutter, a cam on said drive shaft acting to swing said guide arm against the tension of the spring, and pawl and ratchet mechanism operated from said drive shaft for rotating said platen.

10. In a machine of the class described, a cylindrical platen with means for intermittently rotating it, a cooperating presser roll, a feed table adjacent the bight of the rolls on one side, adjustable guides thereon, a cutting device cooperating with the platen on the side opposite said feed table, and means for imparting to said cutting device a four motion movement.

In testimony whereof, I affix my signature.

JAMES W. BRUNDAGE.